US009812687B2

United States Patent
Ito et al.

(10) Patent No.: US 9,812,687 B2
(45) Date of Patent: Nov. 7, 2017

(54) ELECTRIC STORAGE DEVICE

(71) Applicant: GS Yuasa International Ltd., Kyoto-shi (JP)

(72) Inventors: Syun Ito, Kyoto (JP); Shogo Tsuruta, Kyoto (JP); Seiichi Irie, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 76 days.

(21) Appl. No.: 14/836,148

(22) Filed: Aug. 26, 2015

(65) Prior Publication Data
US 2015/0364736 A1     Dec. 17, 2015

Related U.S. Application Data

(63) Continuation of application No. 13/767,130, filed on Feb. 14, 2013, now Pat. No. 9,147,867.

(30) Foreign Application Priority Data

Feb. 14, 2012  (JP) ................................. 2012-029677
Dec. 28, 2012  (JP) ................................. 2012-288296

(51) Int. Cl.
*H01M 2/12*     (2006.01)

(52) U.S. Cl.
CPC ........... *H01M 2/1241* (2013.01); *H01M 2/12* (2013.01); *H01M 2/1288* (2013.01); *H01M 2200/20* (2013.01)

(58) Field of Classification Search
None
See application file for complete search history.

(56) References Cited

U.S. PATENT DOCUMENTS 7,727,668 B2 *  6/2010  Kim ................. B29C 45/14336
                                                    429/174
8,354,181 B2     1/2013  Suzuki et al.
(Continued)

FOREIGN PATENT DOCUMENTS

JP   62-272457 A    11/1987
JP   2002-184379 A   6/2002
(Continued)

OTHER PUBLICATIONS

European Search Report dated May 10, 2013.

*Primary Examiner* — Patrick Ryan
*Assistant Examiner* — Christopher Domone
(74) *Attorney, Agent, or Firm* — McGinn IP Law Group, PLLC

(57) ABSTRACT

An electric storage device including an electrode assembly, a case holding the electrode assembly therein, the case including a container, a lid formed in an opening of the container and including a long side and a short side, and a gas exhausting portion comprising a safety valve formed in the lid, the safety valve being configured to open to exhaust internal gas when an internal pressure reaches a specific level, and a sealing member formed on an outer surface of the lid, the sealing member including a short side which is adjacent to the short side of the lid, and a long side which is adjacent to the long side of the lid, and the sealing member including a protective portion formed over the gas exhausting portion, the protective portion comprising a perforation.

20 Claims, 11 Drawing Sheets

(56) References Cited

U.S. PATENT DOCUMENTS

| | | | |
|---|---|---|---|
| 2010/0233520 A1* | 9/2010 | Suzuki | H01M 2/0277 |
| | | | 429/56 |
| 2010/0247984 A1 | 9/2010 | Yamashita et al. | |
| 2011/0287286 A1 | 11/2011 | Ahn et al. | |
| 2012/0015219 A1* | 1/2012 | Wang | H01M 2/1241 |
| | | | 429/53 |

FOREIGN PATENT DOCUMENTS

| | | |
|---|---|---|
| JP | 2008-235082 A | 10/2008 |
| JP | 2010-049883 A | 3/2010 |
| WO | WO 98/56052 | 12/1998 |

* cited by examiner

ELECTRIC STORAGE DEVICE

RELATED APPLICATIONS

This application is a Continuation Application of U.S. patent application Ser. No. 13/767,130, filed on Feb. 14, 2013.

CROSS REFERENCE TO RELATED APPLICATION

This application claims priority from Japanese Patent Applications No. 2012-29677 filed on Feb. 14, 2012 and No. 2012-288296 filed on Dec. 28, 2012. The entire content of these priority applications is incorporated herein by reference.

TECHNICAL FIELD

The technology described in this specification relates to an electric storage device.

BACKGROUND

A known electric storage device includes an electrode assembly and an electrolyte held in a case. The electrode assembly includes electrode plates. Each electrode plate has a metal foil surface and an active material layer formed on the metal foil surface. Such an electric storage device may be a battery or an electric double layer capacitor. The case may include a safety valve in the outer surface of the case to exhaust gas in the case if an internal pressure in the case reaches a specific value. The safety valve may include a breakable portion. A protective film may be affixed to the outer surface of the case so as to cover the safety valve.

With the protective film, foreign substances, such as water and oil, are less likely to adhere to the safety valve, that is, the safety valve is protected from corrosion. However, the protective film may cause the following problem. Enclosed space is provided between the protective film and the safety valve and thus an internal pressure in the enclosed space increases during breaking of the breakable portion. Namely, force against the increasing internal pressure needs to be applied to break the breakable portion.

If a gas discharge outlet such as the safety valve is covered with the protective film, the gas discharge outlet is not easily broken even when the internal pressure reaches a specific level. Furthermore, the protective film may be removed from the case when gas is discharged and the removed film may have an adverse effect on peripheral devices.

SUMMARY

An advantage of some aspects of the invention is to provide an electric storage device including a case with a gas exhaust portion that is covered with a sealing member that protects the gas exhaust portion from foreign materials and through which internal gas escapes while being removed from the case when an internal pressure of the case increases.

An electric storage device includes an electrode assembly, a case, and a sealing member. The case includes a gas exhaust portion that opens to exhaust internal gas when an internal pressure increases. The sealing member is affixed to the case. The sealing member includes a protective portion and at least one of a perforation and a thin section having a thickness smaller than another section of the sealing member. The protective portion covers the gas exhaust portion of the case.

According to the technology described herein, the gas exhaust portion is protected from foreign materials and the internal gas is exhausted when the internal pressure reaches the specific level while the sealing member remains on the case.

DETAILED DESCRIPTION

First Embodiment

A first embodiment will be described with reference to FIGS. 1 to 5. A non-aqueous electrolyte secondary battery 1 (hereinafter simply referred to as a battery) is used as an electric storage device. The battery 1 may be installed in a vehicle such as an electric vehicle and a hybrid vehicle. In the following description, the top-bottom direction of the battery 1 corresponds to the vertical direction in FIG. 1. The front-rear direction of the battery 1 corresponds to a direction from lower left to upper right in FIG. 1.

Figure 1:
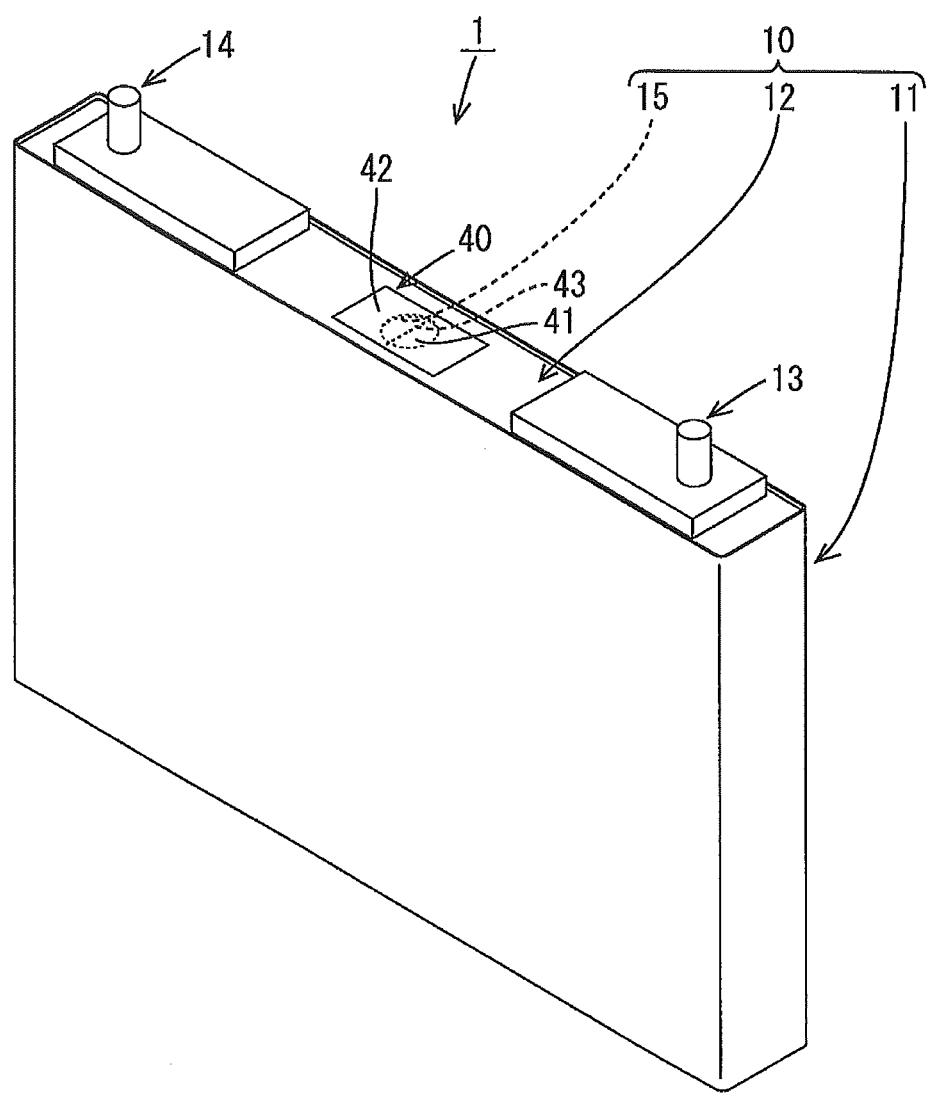
FIG. 1 is a perspective view of a battery 1 according to a first embodiment.
Figure 2:
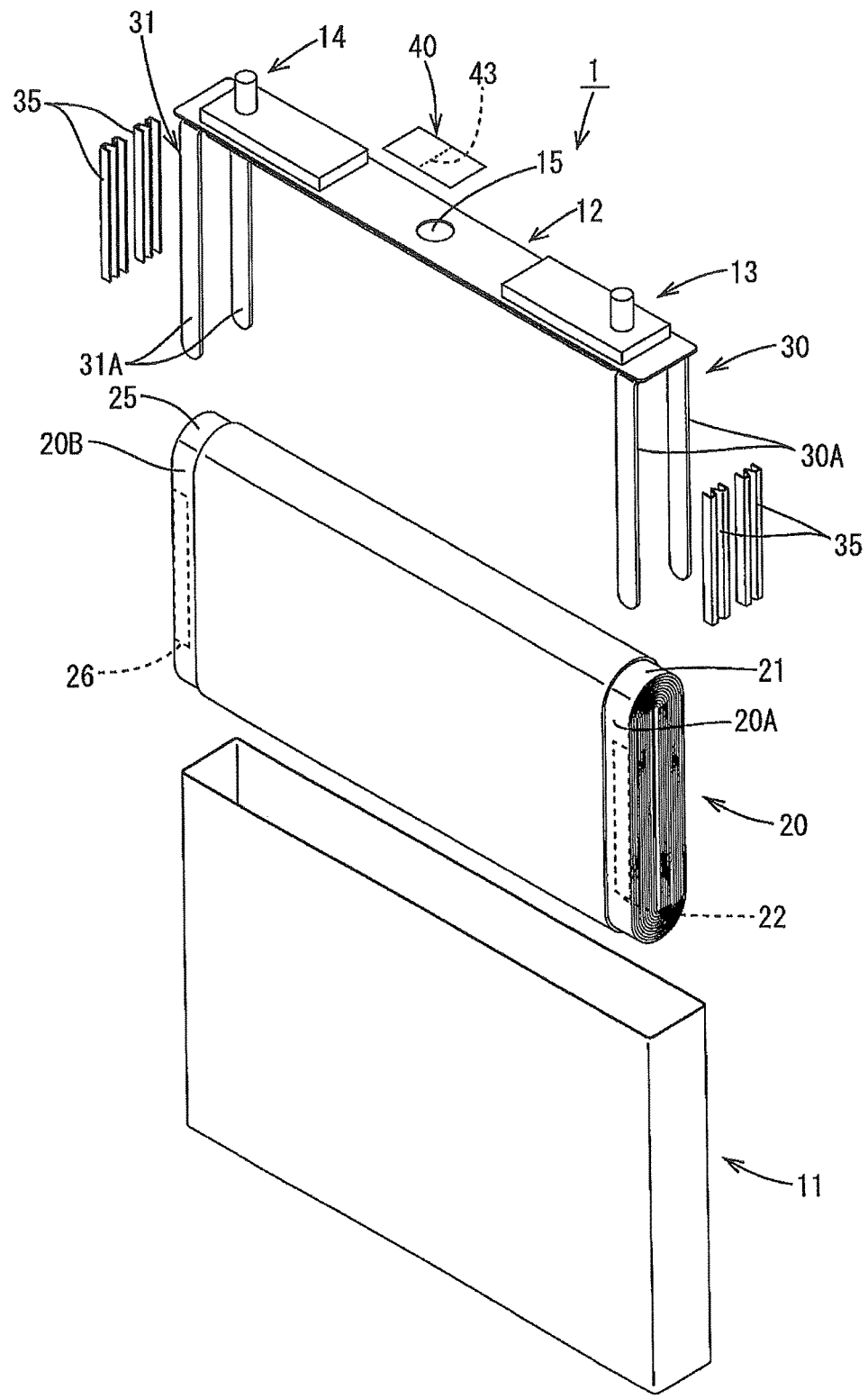
FIG. 2 is an exploded perspective view of the battery 1.

As illustrated in FIG. 2, a battery 1 includes a box-shaped case 10 and an electrode assembly 20. The case 10 includes container 11 and a lid 12. The container 11 is filled with an electrolyte. The container 11 has a box-like shape with an opening at the top (see FIG. 2). More specifically, the container 11 has a rectangular box-like shape. The opening of the container 11 is covered with a lid 12 having a rectangular plate-like shape.

The electrode assembly 20 is arranged in the container 11. The electrode assembly 20 includes a positive electrode 21, a negative electrode 25, and a separator (nor illustrated). The positive electrode 21 and the negative electrode 25 have a tape-like shape. The positive electrode 21 and the negative electrode 25 are wound in the longitudinal direction thereof into a flattened shape with the separator therebetween.

The positive electrode 21 includes an aluminum foil and a positive active material layer. The positive electrode 21 includes a portion in which the positive active material layer is formed on a surface of the aluminum foil and a strip-like positive exposed portion 20A having a smaller width than that of the other portion. In the positive exposed portion 20A, the positive active material layer is not formed on the surface of the aluminum foil, that is, a bare aluminum foil is provided. The positive exposed portion 20A is located at one of short-side ends of the electrode assembly 20.

The negative electrode 25 includes a copper foil and an negative active material layer. The negative electrode 25 includes a portion in which the negative active material layer is formed on a surface of the copper foil and a strip-like negative exposed portion 20B having a smaller width than that of the other portion. In the negative exposed portion 20B, the negative active material layer is not formed, that is, a bare copper foil is provided. The negative exposed portion 20B is located at the other short-side end of the electrode assembly 20.

The positive exposed portion 20A and the negative exposed portion 20B have a positive welding area 22 and a negative welding area 26, respectively.

The battery 1 further includes a positive terminal 13, a negative terminal 14 (external terminals), a positive current collector 30, and a negative current collector 31. The positive terminal 13 and the negative terminal 14 project from the lid 12. The positive terminal 13 and the negative terminal 14 are located close to the respective long-side ends of the lid 12. The positive terminal 13 and the negative terminal 14 are connected to the positive current collector 30 and the negative current collector 31, respectively. Gaskets (not illustrated) are arranged on the outer and the inner surface of the lid 12 (or inside and outside of the container 11), respectively. The lid 12 and the gaskets are arranged between the positive terminal 13 and the positive current collector 30 or between the negative terminal 14 and the negative current collector 31.

Each of the positive current collector 30 and the negative current collector 31 is a metal plate having a sufficient thickness to provide a large ampacity. Specifically, the positive current collector 30 is an aluminum alloy plate and the negative current collector 31 is a copper alloy plate. The positive current collector 30 includes a pair of positive connecting portions 30A that extend downward from the inner surface of the lid 12 and face each other. The negative current collector 20 includes a pair of negative connecting portions 31A that extend downward from the inner surface of the lid 12 and face each other. The positive connecting portions 30A and the negative connecting portions 31A extend downward along the positive exposed portion 20A and the negative exposed portion 20B of the electrode assembly 20, respectively. The positive connecting portions 30A are arranged such that the positive exposed portion 20A is sandwiched therebetween in the front-rear direction. The negative connecting portions 31A are arranged such that the negative exposed portion 20B is sandwiched therebetween in the front-rear direction.

The positive connecting portions 30A and the negative connecting portions 31A are connected to the positive welding area 22 and the negative welding area 26 with clips 35, respectively. Each clip 35 is made of material having about the same resistance as that of the current collectors 30 and 31 or the welding areas 22 and 26. For instance, the clips 35 that connect the positive connecting portions 30A to the positive welding area 22 may be made of aluminum alloy. The clips 35 that connect the negative connecting portions 31A to the negative welding area 26 may be made of copper alloy.

Figure 4:
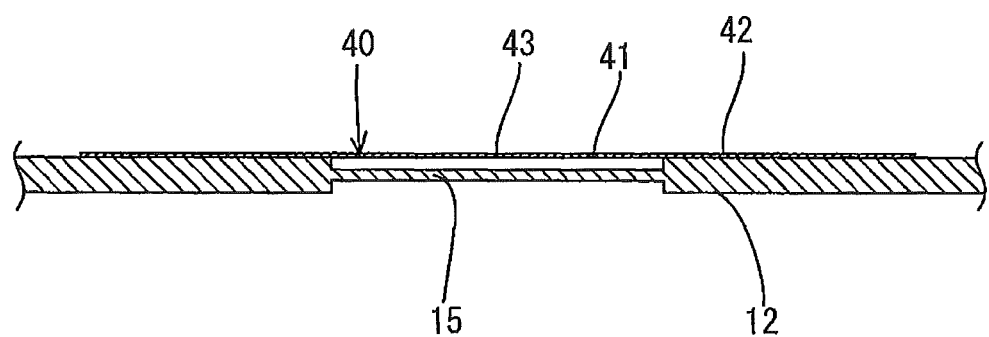
FIG. 4 is a cross-sectional view of a part of the battery 1.

The case 10 further includes a safety valve 15 provided in the lid 12 (one of faces of the case 10) for exhausting internal gas in the container 11. The safety valve 15 is formed in a round shape with a diameter smaller than the short edge of the lid 12 and located in a middle of the lid 12. As illustrated in FIG. 4, the safety valve 15 has a thickness smaller than that of the lid 12. An outer surface of the safety valve 15 is located inner than an outer surface of the lid 12 and an inner surface of the safety valve 15 is located outer than an inner surface of the lid 12.

Figure 5:
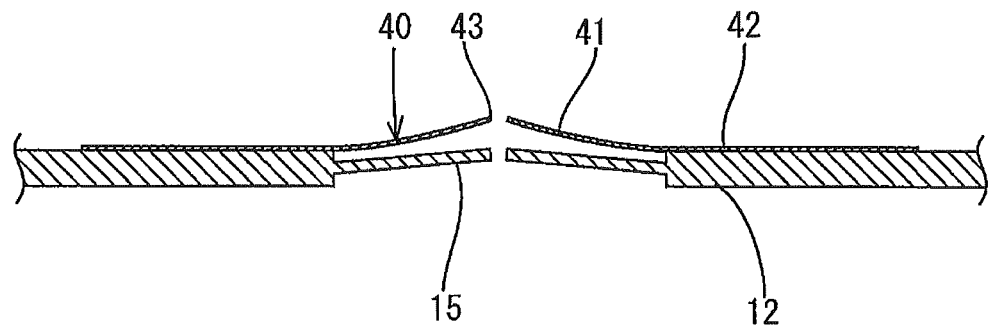
FIG. 5 is a cross-sectional view of the part of the battery 1 illustrating a broken safety valve 15 and a broken sealing member 40.

The safety valve 15 has rigidity lower than that of the lid 12 or the container 11. If the internal pressure of the container 11 is increased, the safety valve 15 breaks before the lid 12 or the container 11 breaks. If the internal pressure of the container 11 reaches a specific level, the safety valve 15 breaks as illustrated in FIG. 5. As a result, the gas in the container 11 escapes therefrom.

The safety valve 15 is provided integrally with the lid 12. The safety valve 15 may corrode if foreign materials such as water and oil adhere thereto. To protect the safety valve 15 from corrosion, a sealing member 40 is affixed to the lid 12 so as to entirely cover the safety valve 15. The sealing member 40 is a resin sheet. An adhesive is applied to an entire area of one of surfaces of the sealing member 40. The surface, to the entire area of which the adhesive is applied, is an adhesive portion 42 that is affixed to the outer surface of the lid 12. The other surface of the sealing member 40 is a protective portion 41.

When the sealing member 40 is affixed to the lid 12 so as to entirely cover the safety valve 11, the adhesive surface is affixed to the lid 12. The sealing member 40 is held to the lid 12. The foreign materials may stick to the protective portion 41 but not to the safety valve 11. Namely, the foreign materials are blocked by the sealing member 40.

The thickness of the sealing member 40 is about 100 μm. A preferable thickness range of the sealing member 40 is from 50 μm to 150 μm. If the thickness is smaller than the 50 μm, affixation of the sealing member 40 to the lid 12 is difficult. If the thickness is larger than 150 μm, a cost increases.

The sealing member 40 is made of polyethylene terephthalate (PET). The sealing member 40 may be made of different material but preferably polyolefin material such as polypropylene (PP).

Figure 3:
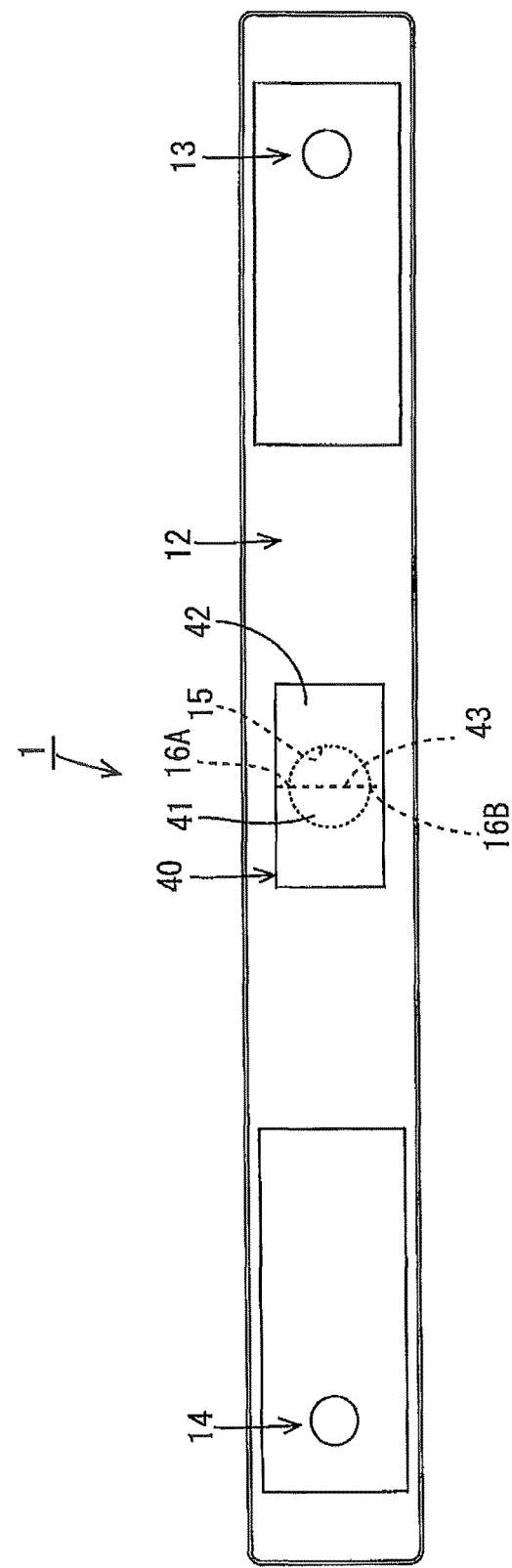
FIG. 3 is a plan view of the battery 1.

As illustrated in FIG. 3, the sealing member 40 has a rectangular shape elongated in the longitudinal direction of the lid 12. The sealing member 40 has a perforation (or a slit) 43 in the middle thereof. The perforation 43 extends from a first long edge to a second long edge of the sealing member 40 opposite to each other across the safety valve 15. The perforation 43 includes a plurality of through holes arranged in line. A size of each through hole is defined such that foreign materials do not pass through.

The perforation 43 is arranged on a line between a first point 16A at the edge of the safety valve 15 the closest to the first long edge and a second point 16B at the edge of the safety valve 15 the closest to the second long edge. Namely, the perforation 43 extends across the safety valve 15 via the closest point of the safety valve 15 to the first long edge and the closest point of the safety valve 15 to the second long edge.

Next, assembly, operation and effects of this embodiment will be explained.

Firstly, the assembly will be explained. The positive active material layer is formed on the aluminum foil of the positive electrode 21 by applying or spraying slurry including the positive active material to the surface of the aluminum foil and drying it out. The negative material layer is formed on the copper foil of the negative electrode 25 by applying or spraying slurry including the negative active material to the surface of the copper foil and drying it out.

The foils on which the active material layers are formed are pressed in the thickness direction thereof in a roll press process. As a result, the positive electrode 21 and the negative electrode 25 are provided. The positive electrode 21 and the negative electrode 25 are then wound with the separator arranged therebetween. As a result, the electrode assembly 20 is provided. The positive exposed portion 20A of the positive electrode 21 and the negative exposed portion 20B of the negative electrode 25 are at the respective ends of the electrode assembly 20.

The positive current collector 30 and the negative current collector 31 are connected to the electrode assembly 20. The positive connecting portion 30A and the positive welding area 22 are sandwiched between the clips 35 and welded together by ultrasonic welding or other kind of welding. The negative connecting portion 31A and the negative welding area 26 are sandwiched between the clips 35 and welded together by ultrasonic welding of other kind of welding. The electrode assembly 20 and the current collectors 30 and 31, which are welded together, are installed in the container 11. Then, the container 11 is filled with the electrolyte, and the lid 12 is fixed to the container 11 to cover the opening of the container 11 while the terminals 13 and 14 are projected to the outside. The sealing member 40 is attached to the lid 12 so as to entirely cover the safety valve 15. This completes the assembly of the battery 1.

Secondly, the operation will be explained. The adhesive portion 42 is affixed to the outer surface of the lid 12 around the entire circumference of the safety valve 15. If the assembled battery 1 is left under a high-temperature environment, the internal pressure in the container 11 may increase. If the internal pressure reaches the specific level, the safety valve 15 breaks. As a result, the gas blows out of the container 11 and the sealing member 40 breaks at the perforation 43 due to a pressure of the gas. The gas swiftly flows to the outside through the broken parts of the safety valve 15 and the sealing member 40. Because areas of the adhesive portion 42 around the circumference of the safety valve 15 are affixed to the lid 12, the sealing member 40 is less likely to be removed due to the pressure of the gas.

Finally, the effects will be explained. In the battery 1 assembled as described earlier and providing the above operation, the safety valve 15 is protected from foreign materials by the sealing member 40 (or the protective portion 41). Furthermore, if the internal pressure of the container 11 reaches the specific level, the sealing member 40 breaks at the perforation 43 without being removed from the lid 12 such that the gas is discharged from the container 11.

Second Embodiment

Figure 6:
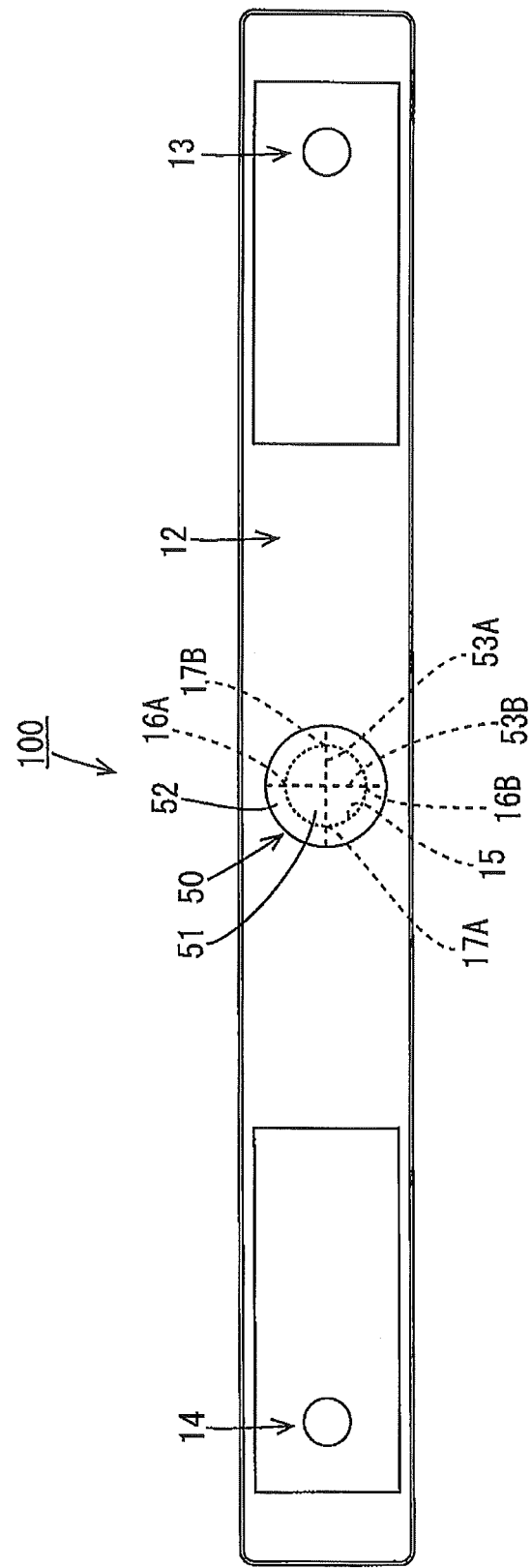
FIG. 6 is a plan view of a battery 100 with a sealing member 50 according to a second embodiment.

A second embodiment will be described with reference to FIG. 6. A battery 100 according to this embodiment includes a sealing member 50 that is different from the sealing member 40 in the first embodiment. Configurations other than the sealing member are the same as those of the first embodiment and thus will not be explained. The protective member 50 in this embodiment has a round shape similar to the safety valve 15 but slightly larger than the safety valve 15. The protective member 50 is arranged coaxially with the safety valve 15.

The sealing member 50 includes an adhesive surface 52, a first perforation 53A, and a second perforation 53B. The first perforation 53A extends in the longitudinal direction of the lid 12 and the second perforation 53B extends perpendicular to the first perforation 53A. The first perforation 53A and the second perforation 53B cross at a center of the sealing member 50.

The second perforation 53B is arranged on a line between the first point 16A at the edge of the safety valve 15 the closest to the first long edge of the lid 12 and the second point 16B at the edge of the safety valve 15 the closest to the second long edge of the lid. Namely, the second perforation 53B extends from a first edge to a second edge of the sealing member 50 opposite to each other across the safety valve 15 via the closest point of the safety valve 15 to the first long edge and the closest point of the safety valve 15 to the second long edge.

The first perforation 53A is arranged on a line between a third point 17A at the edge of the safety valve 15 the closest to the first short edge of the lid 12 and a fourth point 17B at the edge of the safety valve 15 the closest to the second short edge of the lid 12. Namely, the first perforation 53A extends across the safety valve 15 via the closest point of the safety valve 15 to the first short edge and the closest point of the safety valve 15 to the second short edge.

With this configuration, the dimension of the adhesive surface 52 can be reduced. A size of each sealing member is decreased in comparison to that of the sealing member 40 of the first embodiment. A plurality of sealing members having the same configuration as that of the sealing member 50 are produced from one sheet. As the size is decreased, a larger number of sealing members can be produced from the sheet having the same size as a sheet from which sealing members having the same configuration as the sealing member 40 are produced. Therefore, the production cost can be reduced in comparison to the first embodiment. Furthermore, the sealing member 50 with the first perforation 53A and the second perforation 53B is more likely to break in comparison to the sealing member 40 in the first embodiment.

Third Embodiment

Figure 7:
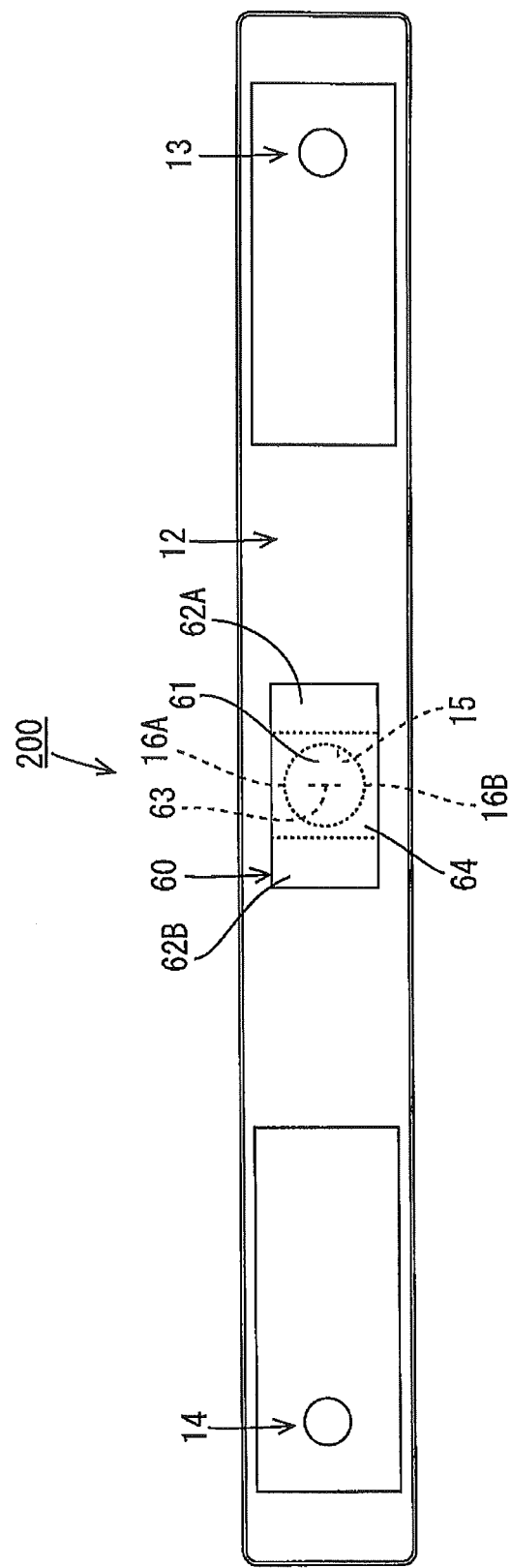
FIG. 7 is a plan view of a battery 200 with a sealing member 60 according to a third embodiment.

A third embodiment will be explained with reference to FIG. 7. A battery 200 according to this embodiment includes a sealing member 60 that has a different configuration from that of the sealing member 40 in the first embodiment. Configurations other than the sealing member 60 are the same as those of the first embodiment and thus will not be explained.

The sealing member 60 in this embodiment has the same overall shape as that of the sealing member 40 in the first embodiment. The sealing member 60 does not include an adhesive portion, to an entire area of which an adhesive is applied. The sealing member 60 includes a protective portion 61, a first adhesive portion 62A, a second adhesive portion 62B, and a non-adhesive portion 64.

The first adhesive portion 62A is located closer to the positive terminal 13 than the safety valve 15 and the second adhesive portion 62B is located closer to the negative terminal 14 than the safety valve 15. The protective portion 61 is located between the first adhesive portion 62A and the second adhesive portion 62B. The non-adhesive portion 64 to which an adhesive is not applied is located in an area other then the protective portion 61 between the first adhesive portion 62A and the second adhesive portion 62B. The sealing member 60 further includes a linear perforation 63 arranged inner than the first point 16A and the second point 16B. The perforation 63 is shorter than the perforation 43 in the first embodiment.

With this configuration, the gas blows out of the container 11 through the safety valve 15 is received by the protective portion 61 and the non-adhesive portion 64. Therefore, the sealing member 60 is less likely to break at any portion thereof other than the perforation 63. Namely, the sealing member 60 can be properly broken at the perforation 63.

Fourth Embodiment

Figure 8:
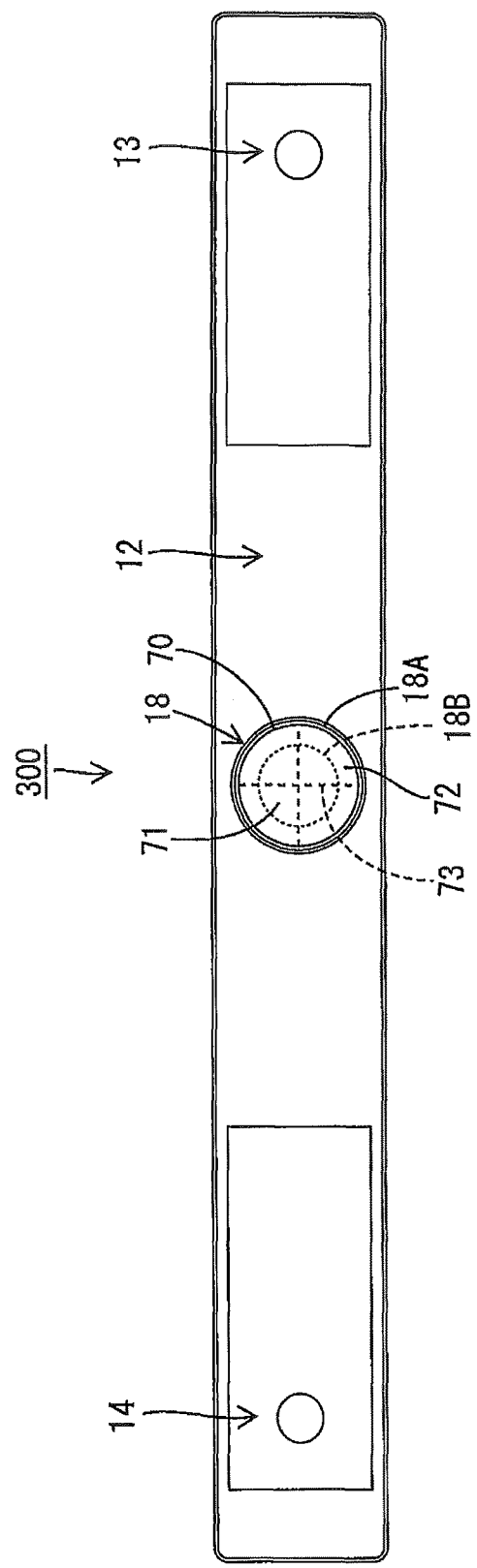
FIG. 8 is a plan view of a battery 300 with a sealing member 70 according to a fourth embodiment.
Figure 9:
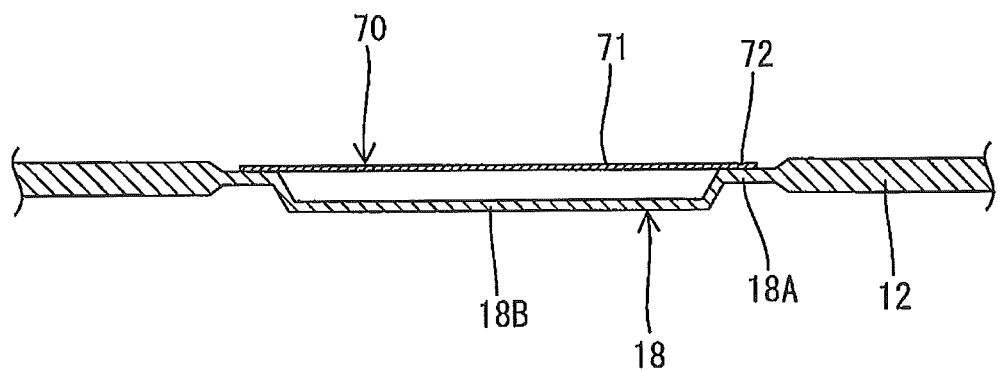
FIG. 9 is a cross-sectional view of a part of the battery 300.

A fourth embodiment will be explained with reference to FIGS. 8 and 9. A battery 300 according to this embodiment includes a sealing member 70 and a safety valve 18 that are different from the sealing member 50 and the safety valve 15 in the second embodiment, respectively. The sealing member 50 is configured to entirely cover the safety valve 15. However, the sealing member 70 in this embodiment is configured such that a part of the safety valve 18 is not covered.

The safety valve 18 includes an attachment portion 18A to which the sealing member 70 is bonded. The attachment portion 18A has an annular shape. The outer surface of the attachment portion 18A is located inner than the outer surface of the lid 12. The sealing member 70 bonded to the attachment portion 18A is located inner than the outer surface of the lid 12. The attachment portion 18A is located within a thickness range of the lid 12.

The safety valve 18 further includes a breakable portion 18B in a round shape recessed inward from the attachment portion 18A such that the bottom thereof is located inner than the attachment portion 18A. The breakable portion 18B has a thickness smaller than that of the attachment portion 18A. The breakable portion 18B is located inner than the attachment portion 18A. The inner surface of the breakable portion 18B is located inner than the inner surface of the lid 12. Therefore, a gap is provided between the sealing member 70 and the breakable portion 18B.

The sealing member 70 has a round overall shape. The sealing member 70 includes an adhesive portion 72, a protective portion 71, and a perforation 73. The adhesive portion 72 is in an annular shape and bonded to the attachment portion 18A. The protective portion 71 is in a round shape and arranged inside the adhesive portion 72. The perforation 73 extends across the breakable portion 18B with ends thereof located in the attachment portion 18A. The adhesive portion 72 is affixed to the outer surface of the attachment portion 18A.

The adhesive portion 72 has an outer diameter smaller than that of the attachment portion 18A. A difference in diameter between the adhesive portions 72 and 18A provides a tolerance in bonding of the sealing member 70 to the safety valve 18.

Fifth Embodiment

A fifth embodiment will be explained with reference to FIGS. 10 and 11. A battery 400 according to this embodiment includes a sealing member 80 having a different configuration from that of the sealing member 40 in the first embodiment. The sealing member 80 includes a thin section 83 instead of a perforation such as the perforation 43 of the sealing member 40 in the first embodiment.

Figure 10:
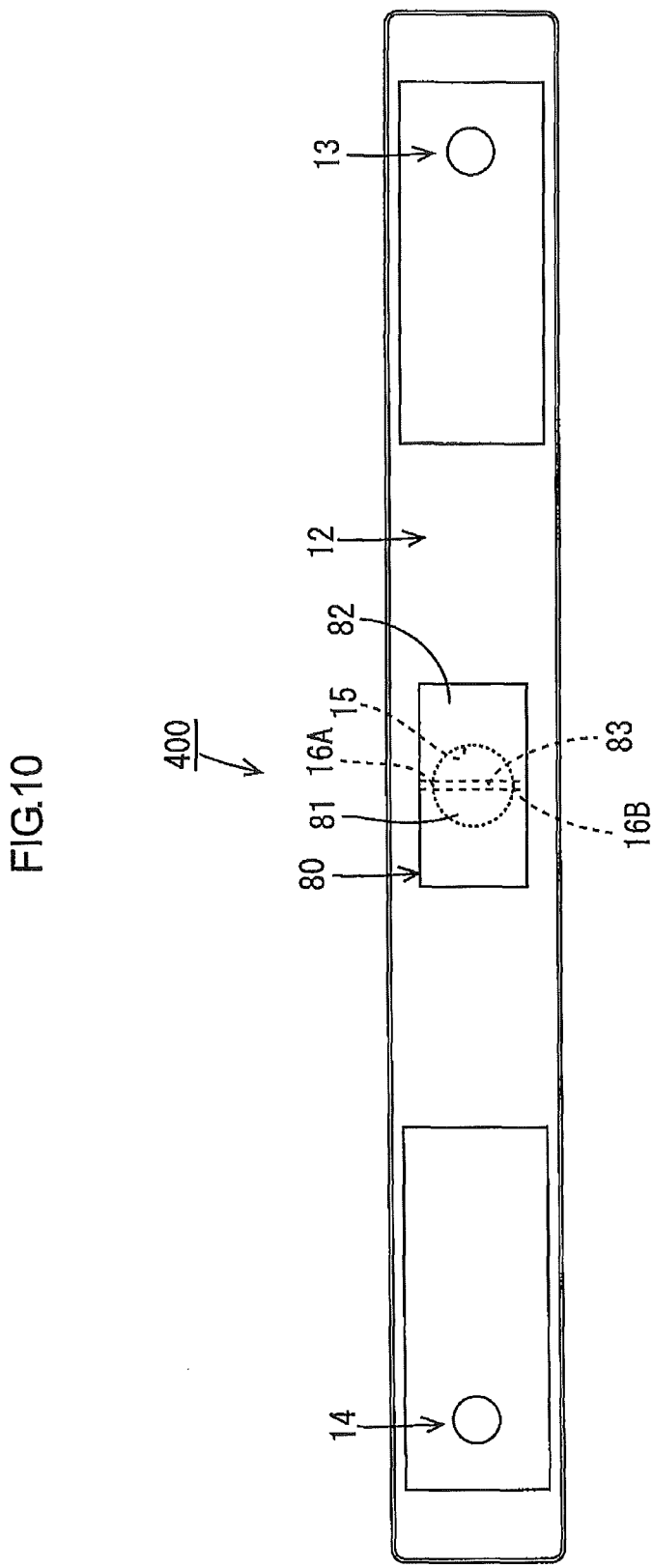
FIG. 10 is a plan view of a battery 400 with a sealing member 80 according to a fifth embodiment.
Figure 11:
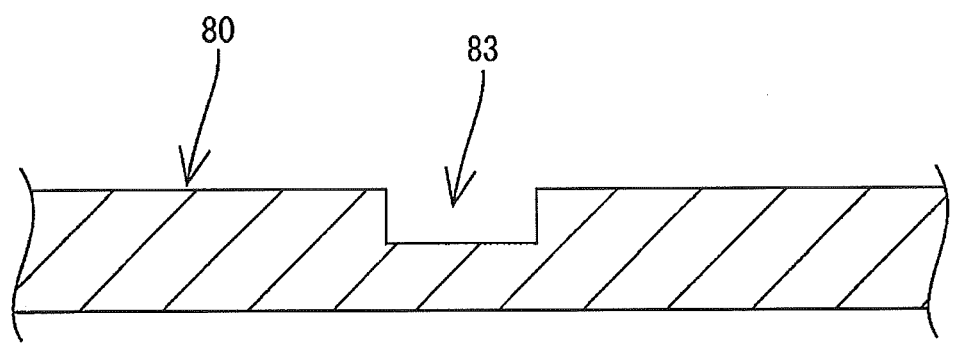
FIG. 11 is a cross-sectional vive of the sealing member 80.

As illustrated in FIG. 10, the sealing member 80 has a rectangular shape elongated in the longitudinal direction of the lid 12. The thin section 83 is located in the middle of the sealing member 80 with respect to the long-side direction of the sealing member 80. The thin section 83 extends in the short-side direction of the sealing member 80. The thin section 83 has a thickness smaller than the other portion of the sealing member 80 and a width smaller than the diameter of the safety valve 15. As illustrated in FIG. 11, a recess is provided in the outer surface of the sealing member 80 to form the thin section 83. The thin section 83 extends from the first long edges of the sealing member to the second long edges. The thin section 83 extends across the safety valve 15 via the closest point 16A of the safety valve 15 to the first long edge and the safety to the closest point 16B of the safety valve 15 to the second long edge.

With this configuration, the case 10 can be more tightly sealed in comparison to the first embodiment. The safety valve 15 is further less likely to corrode in comparison to the first embodiment when foreign materials such as water and oil adhere to the case. Furthermore, the thin section 83 breaks when the internal pressure of the case 10 reaches the specific level. When the thin section 83 breaks, the gas inside the case 10 escapes therethrough while the sealing member 80 remains attached to the lid 12.

Other Embodiments

The present invention is not limited to the embodiments described above with reference to the description and drawings; for example, the following various embodiments will also be included in the technical scope of the invention.

The breakable portion of the sealing member is not limited to a perforation. For instance, the breakable portion may include a plurality of recesses or having a thickness smaller than that of other portion of the sealing member.

A movable valve may be used as a safety valve. The movable valve may be configured to move between an open position and a closed position. When the movable safety valve is at the open position, an opening is defined by the movable safety valve and the lid 12 and the gas escapes from the opening. When the movable safety valve is at the closed position, the opening is closed.

The perforation may cross only one of the first closest point and the second closest point of the safety valve to the respective long edge of the sealing member.

The perforation may be formed in a circle or a curve.

The scope of the present invention may be applied to electric double-layer capacitors.

The perforation may be configured to discharge the gas through the through holes thereof without being broken.

The safety valve may have a rectangular overall shape or a square overall shape.

The outer surface of the safety valve may be convex such that bulges further upward than the outer surface of the lid as long as the safety valve is covered with the sealing member having the same configuration as that of the sealing member 40. The outer surface of the safety valve may be arranged on the same plane as the outer surface of the lid as long as the safety valve is covered with the sealing member having the same configuration as that of the sealing member 40.

The thin section of the sealing member may be formed by providing a recess in the inner surface of the sealing member or recesses in the upper and the inner surface of the sealing member.

The recess provided to form the thin section is not limited a rectangular recess in a cross-sectional view. For example, the recess may be a round recess, a valley-shaped recess, or a valley-shaped recess with a flat bottom. Namely, the recess can take any form as long as the portion of the sealing member in which the recess is formed has a thickness smaller than other portion of the sealing member.

The sealing member may include both perforation and thin section. For instance, the breakable portion of the sealing member may include perforations in areas closer to the long edges and thin section in the middle area. The breakable portion may include thin sections in areas closer to the long edges and a perforation in the middle area. The breakable portion may include perforations and thin sections that are alternately arranged.

The perforation or the thin section may extend in a direction that crosses a long-side direction of the sealing member instead of the short-side direction. Namely, the perforation or the thin section may extend at an angle to the short-side direction.

The invention claimed is:

1. An electric storage device comprising:
   an electrode assembly;
   a case holding the electrode assembly therein, the case including:
      a container;
      a lid formed in an opening of the container and including a long side and a short side; and
      a gas exhausting portion comprising a safety valve formed in the lid, the safety valve being configured to open to exhaust internal gas when an internal pressure reaches a specific level; and
   a sealing member formed on an outer surface of the lid, the sealing member including a short side which is adjacent to the short side of the lid, and a long side which is adjacent to the long side of the lid, and the sealing member including a protective portion formed over the gas exhausting portion, the protective portion comprising a perforation,
   wherein, in a plan view of the lid, the perforation terminates within the protective portion of the sealing member.

2. The electric storage device according to claim 1, wherein the sealing member comprises a resin sheet including an adhesive portion to which an adhesive is applied.

3. The electric storage device according to claim 2, wherein the adhesive portion is bonded to the outer surface of the lid on opposing sides of the protective portion in a direction of the long side of the sealing member.

4. The electric storage device according to claim 2, wherein the safety valve comprises a circular shape and the adhesive portion of the sealing member is formed around a circumference of the safety valve.

5. The electric storage device according to claim 2, wherein the sealing member comprises a single sheet.

6. The electric storage device according to claim 1, wherein a thickness of the sealing member is in a range from 50 μm to 150 μm.

7. The electric storage device according to claim 1, wherein the perforation includes a portion that extends substantially parallel to the long side of the sealing member.

8. The electric storage device according to claim 1, wherein the perforation includes a through hole.

9. The electric storage device according to claim 1, wherein the perforation includes a plurality of through holes.

10. The electric storage device according to claim 1, wherein the sealing member is affixed to the outer surface of the lid.

11. The electric storage device according to claim 1, wherein sealing member comprises a rectangular shape.

12. The electric storage device according to claim 1, wherein the sealing member covers an entirety of the gas exhausting portion.

13. The electric storage device according to claim 1, wherein an outer surface of the gas exhausting portion is located inward from the outer surface of the lid, and
   wherein the protective portion of the sealing member faces the outer surface of the gas exhausting portion with a gap therebetween.

14. The electric storage device according to claim 1, wherein the safety valve is integrally formed with the lid and includes a thickness which is less than a thickness of the lid.

15. An electric storage device comprising:
   an electrode assembly;
   a case holding the electrode assembly therein, the case including:
      a container;
      a lid formed in an opening of the container and including a long side and a short side; and
      a gas exhausting portion comprising a safety valve formed in the lid, the safety valve being configured to open to exhaust internal gas when an internal pressure reaches a specific level; and
   a rectangular-shaped sealing member formed on an outer surface of the lid, the sealing member including a short side which is adjacent to the short side of the lid, and a long side which is adjacent to the long side of the lid, and the sealing member further comprising:
      a protective portion formed over the gas exhausting portion, the protective portion comprising a perforation that extends substantially parallel to the short side of the sealing member; and
      an adhesive portion which is bonded by adhesive to the outer surface of the lid on opposing sides of the protective portion in a direction of the long side of the sealing member,
   wherein, in a plan view of the lid, the perforation terminates within the protective portion of the sealing member.

16. The electric storage device according to claim 1, wherein the sealing member further comprises:
   a first adhesive portion which is bonded by adhesive to the outer surface of the lid on a first side of the protective portion in a direction of the long side of the sealing member; and
   a second adhesive portion which is bonded by adhesive to the outer surface of the lid on a second side of the protective portion in a direction of the long side of the sealing member.

17. The electric storage device according to claim 16, wherein the sealing member further comprises:
   a non-adhesive portion formed around a circumference of the protective portion and separating the first and second adhesive portions.

18. The electric storage device according to claim 1, wherein the safety valve comprises a recessed portion formed in the outer surface of the lid, and a recessed portion formed in an inner surface of the lid.

19. The electric storage device according to claim 1, wherein the perforation comprises a line-shaped perforation.

20. The electric storage device according to claim 1, wherein a central portion of the perforation coincides with a central portion of the safety valve.

* * * * *